(12) United States Patent
Yee et al.

(10) Patent No.: US 7,794,508 B2
(45) Date of Patent: Sep. 14, 2010

(54) METHODS FOR PRODUCING COLORED GLUE-LAMINATED BAMBOO TIMBER ARTICLES

(75) Inventors: Maria Yee, Santa Cruz, CA (US); Yong Ming Zhao, Guangzhou (CN)

(73) Assignee: Maria Yee, Inc., Scotts Valley, CA (US)

( * ) Notice: Subject to any disclaimer, the term of this patent is extended or adjusted under 35 U.S.C. 154(b) by 99 days.

(21) Appl. No.: 12/357,344

(22) Filed: Jan. 21, 2009

(65) Prior Publication Data

US 2009/0271931 A1 Nov. 5, 2009

(30) Foreign Application Priority Data

May 5, 2008 (CN) .................. 2008 1 0094143

(51) Int. Cl.
*D06P 3/60* (2006.01)
(52) U.S. Cl. ........................................... 8/402
(58) Field of Classification Search ........... 8/402
See application file for complete search history.

(56) References Cited

U.S. PATENT DOCUMENTS

2007/0014922 A1* 1/2007 Matrossov et al. .......... 427/294

FOREIGN PATENT DOCUMENTS

| CN | 1736673 | * | 2/2006 |
| EP | 1844681 | * | 10/2007 |
| JP | 408309712 | * | 11/1996 |
| WO | WO 2007/020657 | * | 2/2007 |

* cited by examiner

*Primary Examiner*—Lorna M Douyon
*Assistant Examiner*—Amina Khan
(74) *Attorney, Agent, or Firm*—Haynes & Boone, LLP

(57) ABSTRACT

A method for producing colored gluelam bamboo articles includes splitting bamboo stalks into strips and removing the tabasheer and bamboo rind from the strips. The strips are steamed and then dyed under a high-pressure. The dyed bamboo strips are then dried and planed into a finish plane form. The dyed and finished plane strips are then laminated together with an adhesive to form bamboo timber boards or panels of various sizes. The colored gluelam bamboo timber articles produced exhibit a beautiful, natural dyed appearance in which the natural texture of the bamboo is brought forth and fully preserved after the dyeing, and gluelam bamboo timber products produced from the boards or panels will not warp in the presence of high humidity. The method results in low equipment and manufacturing costs and a high production efficiency.

4 Claims, 3 Drawing Sheets

METHODS FOR PRODUCING COLORED GLUE-LAMINATED BAMBOO TIMBER ARTICLES

RELATED APPLICATIONS

This application claims priority of Chinese Patent Application No. 200810094143.8, filed May 5, 2008, the entire disclosure of which is incorporated herein by reference.

BACKGROUND

1. Technical Field

The present invention relates to a method for producing glue-laminated (gluelam) bamboo timber articles, such as flooring, and more particularly, to a method for producing colored gluelam bamboo timber articles.

2. Related Art

Methods for producing colored gluelam bamboo timber articles, e.g., bamboo flooring, are known in the prior art. For example, Chinese Utility Model Patent No. ZL200520013915.2, publication number CN2811449, discloses a method for making colored bamboo timber flooring that produces a colored, woven-strand type of flooring.

The processing method for coloring these products is as follows. A dyeing liquor is mixed with an adhesive to form a colored glue. Bamboo threads are then immersed in the colored glue and the resulting mixture is then formed in a mold under high-pressure. Alternatively, the bamboo threads are first soaked with the dyeing liquor, then immersed in the adhesive, and then formed in a mold under high-pressure. However the foregoing processes exhibit certain disadvantages, including the following:

- In the dyeing process, the dyeing liquor penetrates through the bamboo threads slowly from the surface to the interior, which takes a long time and results in a very uniform coloring of the product in which the natural texture of bamboo is entirely lost and an unnatural color is exhibited;
- Since the bamboo flooring must be compressed and formed under high-pressure, typically with a pressure over 50 MPa, large compressing machines with capacities of greater than 2000 tons are required;
- Typically, a compressing machine can press only a single, unique size of laminated colored bamboo thread materials; the length of the colored bamboo threads useable is therefore also limited, typically to 1800 mm, because of the size of the workbench of the compressing machine, which therefore restricts the machine's use; in order to increase the useable length, a larger compressing machine is required;
- Since a mold is also required in the compressing process, the size of the laminated colored bamboo threads materials is likewise limited to a maximum of about 1800 mm×105 mm×130 mm, due to the size limitations of the mold;
- The formed laminated materials have to be split before they can be used, so a splitting machine is also required, which restricts the width of the laminated materials; the maximum practical width of the product is therefore only about 105 mm, due to the limitation of the splitting machines;
- The bamboo threads are immersed in the glue, which results in a large joining area with the glue, and consequently, a high glue content of 8~15% and a high product density of 900~1300 kg/m$^3$; as a consequence of the high glue content, the bamboo flooring products produced thereby are not environmentally friendly, and in some cases, can even be harmful to the health of consumers;
- Due to the high pressures involved in the molding process, most of the pores of the bamboo pores are closed shut during compression; as a result, the laminated bamboo materials can warp easily in humidity, which causes flooring to exhibit a warped surface and bad appearance;
- Due to the high-pressure forming process, the moisture inside the laminated materials is not easily removed, so that boards of, e.g., 15 mm thickness, must be dried for at least 45 days before they can be used; the time required by the production process is therefore inherently long and unsuitable for mass production As a result of the foregoing and other drawbacks, the prior art methods result in high cost, low yield and low production efficiency.

SUMMARY

In accordance with the present invention, novel methods are provided that overcome the above and other disadvantages of the prior art and that produce colored glue-laminated (gluelam) bamboo timber articles with superior dyeing effects, aesthetic appearance and low production costs.

In one example embodiment, a method for producing colored gluelam bamboo timber articles includes: Splitting bamboo stalks into strips; removing the tabasheer and bamboo rind from the strips; steaming the strips; dyeing the steamed strips under a high-pressure; drying the dyed strips; planing the dried bamboo strips into a finished plane form; and, laminating the finished plane form bamboo strips together with an adhesive to form boards or panels of various sizes.

In one possible embodiment, the steamed bamboo strips can undergo carbonization treatment before being dyed under high-pressure.

The high-pressure dyeing process may include placing the steamed or carbonized bamboo strips into a dyeing tank, closing off the tank and forming a vacuum in the tank of about −0.01~−0.1 MPa. The vacuum is maintained in the tank for a selected period of time, and then an inlet of the dyeing tank is opened to a source of a dyeing liquor, causing the vacuum in the tank to suck the dyeing liquor into the tank until it is full. The tank inlet is then coupled to a pressure pump that is used to pressurize the contents of the dyeing tank to a pressure of about 1.0~2.5 MPa, and that pressure is maintained in the tank for a selected period of time. The tank is then depressurized to atmospheric pressure, and the dyeing liquor is drawn from the tank, e.g., by a pump. Another vacuum of about −0.01~−0.1 MPa is then formed in the dyeing tank, and the vacuum in the tank is maintained for a selected period of time. The colored, i.e., dyed, bamboo strips are then removed from the dyeing tank.

In one embodiment, to reduce the humidity of the bamboo strips placed in the dyeing tank, the steamed bamboo strips can undergo a drying treatment before being dyed under high-pressure. In another embodiment, carbonized bamboo strips can also undergo a similar drying treatment before being dyed under high-pressure.

A better understanding of the above and many other features and advantages of the novel manufacturing methods of the present invention may be obtained from a consideration of the detailed description of some example embodiments thereof below, particularly if such consideration is made in conjunction with the appended drawings, wherein like reference numerals are used to identify like elements illustrated in one or more of the figures thereof.

DETAILED DESCRIPTION

Figure 1:
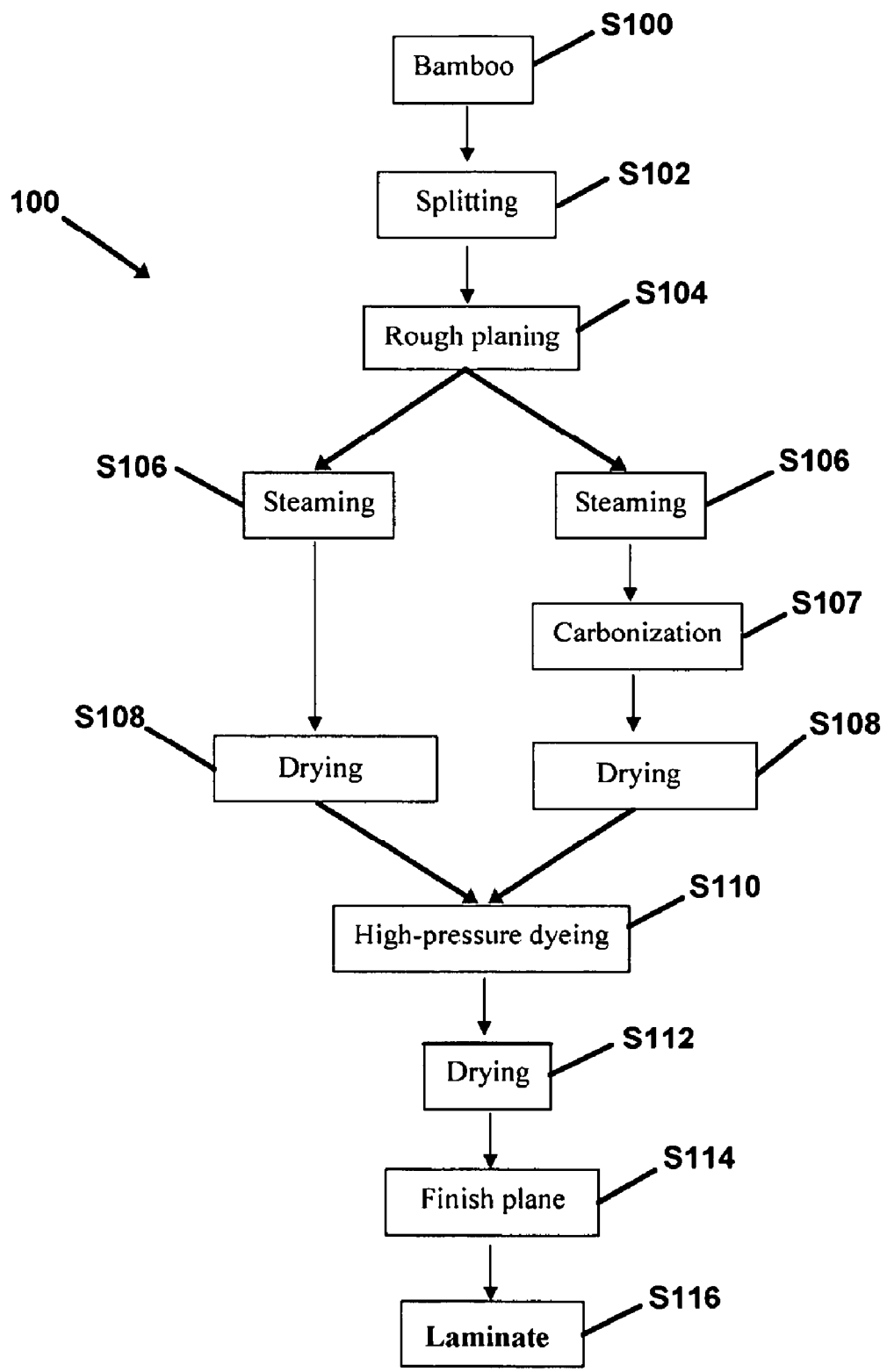
FIG. 1 is a flowchart illustrating an exemplary embodiment of a process for producing colored glued-laminated bamboo timber articles in accordance with the present invention.

The present invention is described in detail hereinafter with reference to the accompanying drawings. Referring to FIG. 1, a example embodiment of a method 100 for producing colored gluelam bamboo timber articles, such as colored bamboo boards or flooring panels, includes the following steps: Starting at S100, a quantity of harvested bamboo stalks is provided to the processing area. At S102, the bamboo stalks are split into strips of a suitable size, and at S104, the strips are rough planed to planarize them to a rough planed state, and the rind and the "tabasheer," i.e., the hard, whitish, translucent substance primarily comprising silica ($SiO_2$), of the bamboo is removed from them.

As illustrated in FIG. 1, in one possible embodiment, at S106, the bamboo strips are then steamed, and after steaming, subjected to a first drying process at S108. In an optional embodiment, the strips are first steamed at S106, then carbonized at S107, and at S108, then dried after the steaming and carbonization steps S106 and S107.

After the bamboo strips are initially dried, at S110, they are placed in a dyeing tank and died under a high-pressure, as described in more detail below. After the bamboo strips are dyed under pressure at S110, they are subjected to a second, final drying process at S112. The dried bamboo strips are then planed again to a final plane finish form at S114, and at S116, the final planed colored bamboo strips are laminated together with an adhesive into colored gluelam bamboo timber articles of various sizes, for example, into flat compressed panels having the same, or optionally, a different surface texture, or alternatively, into elongated compressed boards comprising spliced strips.

Figure 2:
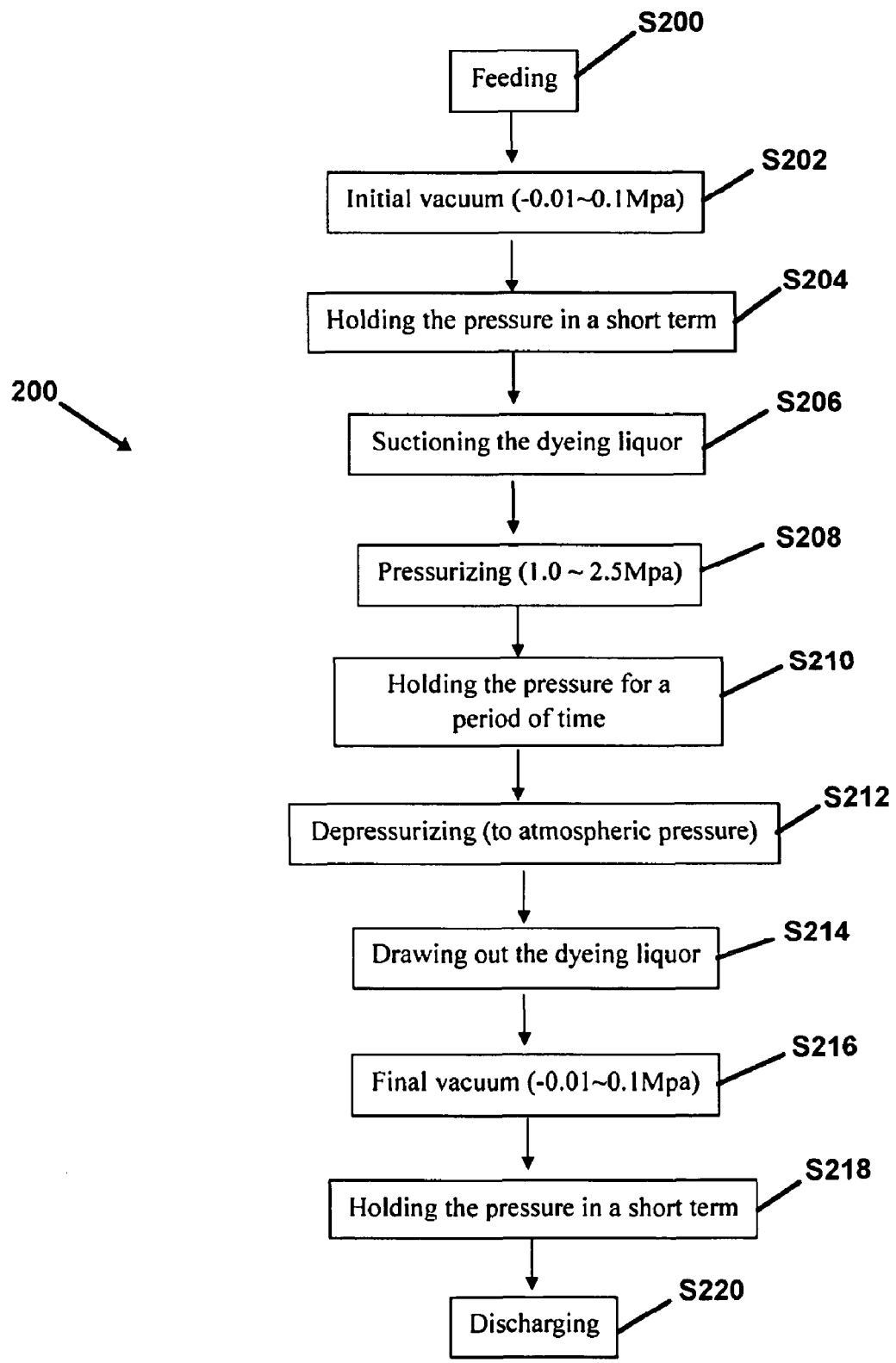
FIG. 2 is a flowchart illustrating an exemplary embodiment of a high-pressure dyeing process for bamboo strips in accordance with the present invention.

FIG. 2 is a flowchart illustrating an example embodiment of the high-pressure bamboo strip dyeing process 200 used at S110 of the method 100 of FIG. 1. Referring to FIG. 2, the high-pressure dyeing process 200 includes the following steps: At S200, the steamed and/or carbonized bamboo strips are fed into a dyeing tank. At S202, the tank is sealed and a first or initial vacuum of about −0.01~−0.1 MPa is formed in the tank, and at S104, the vacuum is maintained in the tank for a selected period of time to ensure that a majority of the air trapped between the bamboo strips and any water trapped in the pores of the bamboo strips is removed from the tank so that the dyeing liquor can more easily penetrate into the pores.

After the air and water is removed from the tank, at S206, an inlet of the dyeing tank is opened to a source of dyeing liquor, e.g., a storage tank of the liquor, such that the dyeing liquor is sucked into the dyeing tank by the vacuum in the tank until the tank is substantially full of the dyeing liquor and bamboo strips. At S208, the inlet of the dyeing tank is closed and a pressure pump is then coupled to the inlet and used to pressurize the dyeing tank to a pressure of about 1.0~2.5 MPa. At S210, the pressure in the tank is maintained for a selected period of time to obtain the desired degree of penetration of the dye into the bamboo, and at S212, the tank is then depressurized to atmospheric pressure. At S214, the dyeing liquor is drawn or pumped from the dyeing tank, and the pumping of the tank is continued at S216 until a second or final vacuum of about −0.01~−0.1 MPa is formed in the tank. At S218, the vacuum is maintained in the tank for a selected period of time to suction off excess dyeing liquor from the pores of the bamboo strips, and at S220, the dyed strips are discharged from the dyeing tank. The foregoing process not only shortens the drying time of the dyed strips and thereby saves drying energy, but also conserves the used dyeing liquor, such that the excess dyeing liquor drawn from the dyeing tank can be returned to the dyeing liquor storage tank for reuse.

Figure 3:
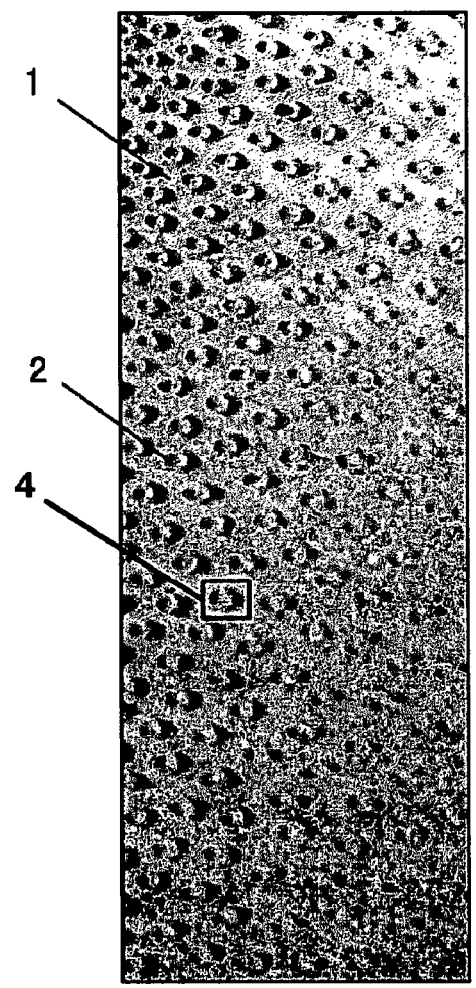
FIG. 3 is an enlarged plan view of a radial section of a bamboo strip in accordance with the present invention; and, FIG. 4 is an enlarged detail view of a portion of the bamboo strip of FIG. 3.
Figure 4:
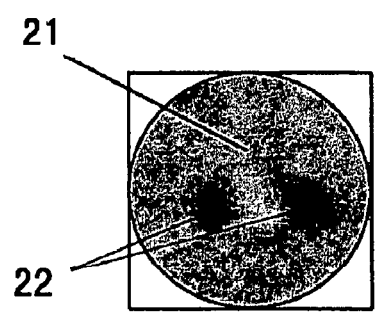

Referring to FIG. 3, those of skill in the art will appreciate that bamboo comprises basic cells 1 and vascular bundles 2. As may be seen in FIG. 4, which is an enlarged detail view of a portion 4 of the bamboo strip of FIG. 3, a vascular bundle 2 comprises its xylem 21 and its phloem 22. The principle underlying the high-pressure dyeing of the present invention is that, under pressure, the dyeing liquor diffuses axially along the basic cells 1 and xylem 21 of the vascular bundles 2, from the surface to the interior of the bamboo strips. However, the phloem 22 is massy and does not accept the dye easily, and accordingly, most of the dyeing liquor diffuses axially along the xylem 21, and thus, the linear pattern of the bamboo is revealed after dyeing and the color of the bamboo strips varies in correspondence with the natural texture of the bamboo. For example, deep color is formed at bamboo knots but the phloem 22 is almost colorless, so that the natural texture of the bamboo is revealed and completely preserved after dyeing. By contrast, in the prior art colored bamboo floor discussed above, bamboo threads are immersed in the dyeing liquor for a long period of time, such that the dyeing liquor penetrates through the bamboo threads slowly from surface to the inner core, which takes a long time and results in a uniformity of color in the finished product so that the natural texture of the bamboo is completely obscured.

In general, the dyeing of bamboo using different processing parameters is guided by the tact that bamboo consists of basic cells and vascular bundles, and the vascular bundles consist of xylem and phloem. The volume of a vascular bundle increases gradually from the rind of the bamboo to the tabasheer, and the density of the vascular bundle also decreases gradually. A large volume vascular bundle is therefore much easier to dye, because the dyeing effect varies in the direction of the thickness of the bamboo.

Compared with the prior art manufacturing methods, the present invention has, among others, the following advantages.

In the dyeing process of the present invention, the color of the bamboo strips varies in accordance with the natural texture of the bamboo; for example, a deep color is exhibited at bamboo knots, but the phloem of the vascular bundles of the strips is almost colorless; thus, the natural linear pattern and texture of the bamboo is brought forth and preserved completely after dyeing, thereby resulting in a novel and aesthetically pleasing appearance of the product.

The dyeing tanks used in the present invention have a relatively large throughput; for example, a tank with a diameter of 1500 mm can accommodate over 1 $m^3$ of gluelam bamboo strips at a time, so one tank can process 4~10 $m^3$ of bamboo material per day, thereby substantially increasing dyeing efficiency.

The dyeing tanks used in the present invention are elongated so as to accommodate a length of dyed bamboo strips in a range from 2400 mm to 4800 mm; as a result, the laminated colored gluelam bamboo timber articles have a length sufficient to meet the needs of different size of boards and other applications.

The equipments used for laminating the colored gluelam bamboo timber articles are the same as used for common gluelam bamboo requiring only a relatively low pressure about 3.7~22 MPa, whereas, the pressure required for conventional colored strand woven bamboo floor is over 50 MPa. Thus, the present invention utilizes simpler equipment, has a high production efficiency and enables production costs that are much lower than that of conventional colored strand woven bamboo flooring, and is therefore more suitable for mass production.

The present invention enables a substantially lower glue content to be used, i.e., on the order of about 2.5~5.3%, and results in a lower density product of 790 kg/m$^3$, which is close to that of the original bamboo, whereas, the density of conventional colored strand woven bamboo floor is as much as 900~1300 kg/m$^3$; further, the colored gluelam bamboo articles of the present invention are substantially free of warping due to humidity; for example, bamboo flooring produced in accordance with the present invention exhibits no tackiness and no obvious warped surface areas after being immersed in water at 100° C. for 2 hours, whereas, conventional colored strand woven bamboo floor will swell up and exhibit obvious warping of its surface under the same conditions.

In the high-pressure dyeing process of the present invention, excess dyeing liquor in the pores of the bamboo is suctioned away by the final vacuum operation, which reduces the internal water content of the dyed bamboo strips, thereby substantially shortening drying time and conserving energy.

In accordance with the present invention, the adhesive is not dyed when assembling the gluelam bamboo strips into articles, and further, the dyeing liquor in the tanks is suctioned for recycled use, thereby effectively conserving dyeing liquor.

The products resulting from dyeing the bamboo strips in accordance with the present invention are beautiful and varied. Different dyeing effects may be obtained simply by controlling the variables of the process, such as the water content of the bamboo strips, the steaming or carbonizing times and temperatures of the strips, the degree of the initial and final vacuums, holding times, dyeing pressures, compression and holding times, and the nature and concentration of the dyeing liquor. In summary, the present invention provides bamboo timber products with the beautiful, natural texture of the bamboo, and with various color effects produced by different treatment and dyeing parameters, thereby providing gluelam bamboo articles with a novel aesthetic appearance.

The colored gluelam bamboo articles of the present invention have wide application, not only in making colored gluelam bamboo furniture and flooring panels, but also in making colored decorative bamboo boards of a type that is increasingly popular among consumers.

By now, those of skill in this art will appreciate that many modifications, substitutions and variations can be made in and to the materials, apparatus, configurations and methods of the novel manufacturing methods of the present disclosure without departing from its scope. Accordingly, the scope of the present disclosure should not be limited to the particular embodiments illustrated and described herein, as they are merely by way of some examples thereof, but rather, should be fully commensurate with that of the claims appended hereafter and their functional equivalents.

What is claimed is:

1. A method for producing a colored gluelam bamboo timber article, the method comprising:
    providing a stalk of bamboo;
    splitting the bamboo stalk into strips;
    removing the tabasheer and bamboo rind from said bamboo strips;
    steaming the bamboo strips;
    dyeing the steamed bamboo strips under pressure;
    drying the dyed bamboo strips;
    planing the dried bamboo strips into a finished plane form; and,
    laminating the finish plane form bamboo strips together with an adhesive to form a gluelam bamboo timber article; wherein the dyeing of the steamed bamboo strips comprises:
    placing the steamed bamboo strips into a dyeing tank;
    forming a first vacuum of about −0.01−−0.1 MPa in the tank;
    maintaining the first vacuum in the tank for a selected period of time;
    using the vacuum in the dyeing tank to suction dyeing liquor into the tank until the tank is filled;
    pressurizing the dyeing tank to a pressure of about 1.0-2.5 MPa;
    holding the pressure in the tank for a selected period of time;
    reducing the pressure in the dyeing tank to atmospheric pressure;
    pumping the dyeing liquor from the dyeing tank;
    forming a second vacuum of about −0.01−−0.1 MPa in the dyeing tank;
    maintaining the second vacuum in the tank for a selected period of time; and,
    removing the dyed bamboo strips from the dyeing tank.

2. The method of claim 1, further comprising carbonizing the steamed bamboo strips before dyeing them.

3. The method of claim 1, further comprising drying the steamed bamboo strips before they are dyed.

4. The method of claim 1, wherein the gluelam bamboo timber article comprises a board or a panel.

* * * * *